United States Patent
Ghosh et al.

(10) Patent No.: US 10,817,800 B2
(45) Date of Patent: Oct. 27, 2020

(54) VALUE ADDITION DEPENDENT DATA MINING TECHNIQUES FOR ASSEMBLY LINES

(71) Applicant: Robert Bosch GmbH, Stuttgart (DE)

(72) Inventors: Rumi Ghosh, Palo Alto, CA (US); Charmgil Hong, Pittsburgh, PA (US); Soundararajan Srinivasan, San Francisco, CA (US)

(73) Assignee: Robert Bosch GmbH, Stuttgart (DE)

( * ) Notice: Subject to any disclaimer, the term of this patent is extended or adjusted under 35 U.S.C. 154(b) by 1011 days.

(21) Appl. No.: 15/342,677

(22) Filed: Nov. 3, 2016

(65) Prior Publication Data
US 2017/0206468 A1    Jul. 20, 2017

Related U.S. Application Data

(60) Provisional application No. 62/280,899, filed on Jan. 20, 2016.

(51) Int. Cl.
*G06N 20/00*        (2019.01)
*G06F 16/22*        (2019.01)
(Continued)

(52) U.S. Cl.
CPC ........... *G06N 20/00* (2019.01); *G05B 19/042* (2013.01); *G05B 23/0275* (2013.01);
(Continued)

(58) Field of Classification Search
CPC ........ G06N 20/00; G06N 20/10; G06N 20/20; G05B 2219/2629; G05B 19/042; G05B 23/0275; G06F 16/2246; G06F 16/24578
See application file for complete search history.

(56) References Cited

U.S. PATENT DOCUMENTS 4,754,410 A * 6/1988 Leech ................. G05B 13/028
706/45
6,493,723 B1  12/2002 Busche
(Continued)

FOREIGN PATENT DOCUMENTS

EP     0875808 A2   11/1998

OTHER PUBLICATIONS

International Search Report for Application No. PCT/EP2017/050935 dated Apr. 10, 2017 (4 pages).

*Primary Examiner* — Austin Hicks
(74) *Attorney, Agent, or Firm* — Michael Best & Friedrich LLP

(57) ABSTRACT

Methods, systems, and apparatuses for performing target parameter analysis for an assembly line including a plurality of stations. One method includes receiving, with an electronic processor, training data associated with the assembly line. The training data including a plurality of attributes. The method also includes receiving, with the electronic processor, value addition data for each of the plurality of stations. The value addition data for each of the plurality of stations specifying a non-negative value added by each of the plurality of stations. The method also includes learning, with the electronic processor, a decision tree based on the training data and the value addition data. The method also includes performing the target parameter analysis based on the decision tree.

19 Claims, 9 Drawing Sheets

(51) Int. Cl.
    *G06F 16/2457*    (2019.01)
    *G05B 23/02*      (2006.01)
    *G05B 19/042*     (2006.01)

(52) U.S. Cl.
    CPC .... *G06F 16/2246* (2019.01); *G06F 16/24578* (2019.01); *G05B 2219/2629* (2013.01)

(56) References Cited

U.S. PATENT DOCUMENTS

| | | |
|---|---|---|
| 6,708,163 B1 | 3/2004 | Kargupta et al. |
| 8,730,181 B1 | 5/2014 | Raman et al. |
| 9,043,267 B2 | 5/2015 | Kozlov et al. |
| 2001/0051947 A1 | 12/2001 | Morimoto et al. |
| 2005/0015217 A1* | 1/2005 | Weidl .................. G05B 17/02 702/185 |
| 2007/0220034 A1 | 9/2007 | Iyer et al. |
| 2008/0281566 A1* | 11/2008 | Wang .................. H01L 22/20 703/7 |
| 2009/0099985 A1 | 4/2009 | Tesauro et al. |
| 2009/0228129 A1* | 9/2009 | Moyne ............ G05B 19/41865 700/102 |
| 2009/0299679 A1* | 12/2009 | Desineni ............ G01R 31/2894 702/119 |
| 2011/0307423 A1 | 12/2011 | Shotton et al. |
| 2012/0154149 A1* | 6/2012 | Trumble .......... G05B 19/41875 340/540 |
| 2012/0191527 A1* | 7/2012 | Reichert ............ G06Q 30/0242 705/14.41 |
| 2013/0103618 A1 | 4/2013 | Urmanov et al. |
| 2016/0116892 A1* | 4/2016 | Cheng ................. G05B 19/048 700/108 |
| 2016/0148850 A1* | 5/2016 | David .................... H01L 22/20 438/5 |

\* cited by examiner

VALUE ADDITION DEPENDENT DATA MINING TECHNIQUES FOR ASSEMBLY LINES

RELATED APPLICATIONS

This application claims priority to U.S. Provisional Application No. 62/280,899, filed Jan. 20, 2016, the entire content of which is herein incorporated by reference.

FIELD

Embodiments described herein relate to methods, systems, and apparatuses for performing data mining to analyze an assembly line when a non-negative value is added by each station of the assembly line.

SUMMARY

Data mining techniques, such as decision trees, neural networks, support vector machines, regression, and the like, may be used to evaluate an assembly line, such as by optimizing production in the assembly line or performing root cause analysis. Identifying the non-negative value added by each station of an assembly may improve such evaluations. For example, maintenance and tuning may be focused on those stations providing increased value to the assembly line to provide more cost-effective optimization and analysis. Accordingly, embodiments described herein provide methods, systems, and apparatuses for performing value addition dependent data mining for an assembly line where value is incrementally added by each station of the assembly line. Some embodiments also provide methods, systems, and apparatuses for performing value addition dependent data mining for an assembly line using decision trees.

Some embodiments provide methods, systems, and apparatuses for performing target parameter analysis using value addition dependent data mining. An example of a target parameter under consideration may be the test measurement labeling a product produced by the assembly line as "scrap" or a "good" or "passing" product. The importance of a station may be based on the combination of the station's effect on the target parameter and the value associated with the station. In some embodiments, the target parameter analysis may be performed using decision trees.

Other embodiments provide methods, systems, and apparatuses for measuring the importance of a station of an assembly line based on a combination of decision theoretic measures and value addition dependent measures. Examples of decision theoretic measures include information gain, Shannon entropy, Renyi entropy, accuracy, and the like. The combined effect of these two measures may be used to determine the decision associated with each node of a decision tree.

Additional embodiments provide methods, systems, and apparatuses for optimizing production in an assembly line using value addition dependent data mining. Some embodiments perform value addition dependent product optimization using decision trees.

Further embodiments provide methods, systems, and apparatuses for performing value addition dependent low yield analysis (including, for example, end-of-line yield analysis) using data mining. Some embodiments perform value addition dependent low yield analysis using decision trees.

Yet further embodiments provide methods, systems, and apparatuses for performing value addition high scrap analysis using data mining. Some embodiments perform value addition dependent high scrap analysis using decision trees.

Other embodiments provide methods, systems, and apparatuses for performing root cause analysis using data mining wherein the importance of a root cause is based on the position of a station within the assembly line. Some embodiments perform root cause analysis using decision trees.

Additional embodiments provide methods, systems, and apparatuses for performing value addition dependent root cause analysis using data mining. Some embodiments perform value addition dependent root cause analysis using decision trees.

Further embodiments provide methods, systems, and apparatuses for detecting stations, tests, measurements, or a combination thereof correlated with a target value for the assembly line when non-negative value is added in each succeeding station of the assembly line using data mining. The term "station" as used herein includes events taking place in the station, such as the assembling of one or more components in the station. Some embodiments detect such correlation using decision trees.

Other embodiments provide methods, systems, and apparatuses for detecting stations, tests, measurements, or a combination thereof that are affecting a target value for the assembly line when non-negative value is added in each succeeding station of the assembly using data mining. Some embodiments detect the effects on a target value using decision trees.

Additional embodiments provide methods, systems, and apparatuses for detecting stations, tests, measurements, or a combination thereof correlated with scrap early in an assembly line when non-negative value is added in station of the assembly line using data mining. Some embodiments detect such correlations using decision trees.

Further embodiments provide methods, systems, and apparatuses for detecting stations, tests, measurements, or a combination thereof correlated with low yield (including, for example, end-of-line yield) early in an assembly line when non-negative value is added in each station of the assembly line using data mining. Some embodiments detect such correlations using decision trees.

Yet further embodiments provide methods, systems, and apparatuses for detecting stations, tests, measurements, or a combination thereof causing scrap early in an assembly line when non-negative value is added in each station of the assembly line using data mining. Some embodiments detect such causes using decision trees.

Additional embodiments provide methods, systems, and apparatuses for detecting stations, tests, measurements, or a combination thereof causing low yield early in an assembly line when non-negative value is added in each station of the assembly line using data mining. Some embodiments detect such causes using decision trees.

Additional embodiments provide methods, systems, and apparatuses for creating a priority list of stations, tests, measurements, or a combination thereof to be investigated for design of experiments and inspection as being correlated with low yield using data mining. Some embodiments create such lists using decision trees.

Other embodiments provide methods, systems, and apparatuses for providing a suggested value for a tunable parameter of the assembly line to reduce scrap (i.e., bring scrap from high scrap zone to a low scrap zone).

Accordingly, embodiments described herein provide methods, systems, and apparatuses for performing value addition dependent data mining in assembly lines. Some embodiments provide value addition dependent data mining in the form of target parameter analysis, wherein the target parameter under consideration may be low yield (including, for example, end-of-line yield), high scrap, and the like. Some embodiments also perform value addition dependent data mining to optimize an assembly line in terms of production or automatically detect important aspects of the assembly line (including, for example, stations, tests, measurements, or a combination thereof) with respect to the target parameter. Also, some embodiments define important parameters based on a combination of decision theoretic measures and value addition dependent data mining techniques. In addition, embodiments perform value addition dependent root cause analysis and may automatically suggest a value for a tunable parameter to reduce scrap. Embodiments may also perform value addition dependent data mining using decision trees. The decision trees may use splitting criterion that takes into consideration the importance of an aspect, such as a station, of the assembly line (e.g., in terms of decision theoretic measures, the value addition provided by the station, or a combination thereof). Examples of decision theoretic measures include information gain using Shannon entropy, information gain using Renyi entropy, accuracy, F-score, precision, recall, and the like. Embodiments described herein may be used on assembly lines for various products, including, for example, car parts, cars, aircrafts, heavy equipment, and the like.

In one embodiment, the invention provides a method of performing target parameter analysis for an assembly line including a plurality of stations. The method includes receiving, with an electronic processor, training data associated with the assembly line. The training data including a plurality of attributes. The method also includes receiving, with the electronic processor, value addition data for each of the plurality of stations. The value addition data for each of the plurality of stations specifying a non-negative value added by each of the plurality of stations. The method also includes learning, with the electronic processor, a decision tree based on the training data and the value addition data. The method also includes performing the target parameter analysis based on the decision tree.

In another embodiment, the invention provides a system for performing target parameter analysis for an assembly line including a plurality of stations. The system includes a server including an electronic processor. The electronic processor is configured to receive training data associated with the assembly line. The training data includes a plurality of attributes. The electronic processor is also configured to receive value addition data for each of the plurality of stations. The value addition data for each of the plurality of stations specifying a non-negative value added by each of the plurality of stations. The electronic processor is also configured to learn a decision tree based on the training data and the value addition data. The electronic processor is also configured to provide a suggested value for a tunable parameter associated with the assembly line based on the decision tree.

In another embodiment, the invention provides a computer readable medium including instructions that, when executed by an electronic processor, cause the electronic processor to a set of functions. The set of functions includes receiving training data associated with an assembly line including a plurality of stations. The training data including a plurality of attributes. The set of functions also includes receiving value addition data for each of the plurality of stations. The value addition data for each of the plurality of stations specifying a non-negative value added by each of the plurality of stations. The set of functions also includes generating a data model based on the training data and the value addition data. The set of functions also includes providing an output evaluating the assembly line based on the data model.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention.

Figure 1:
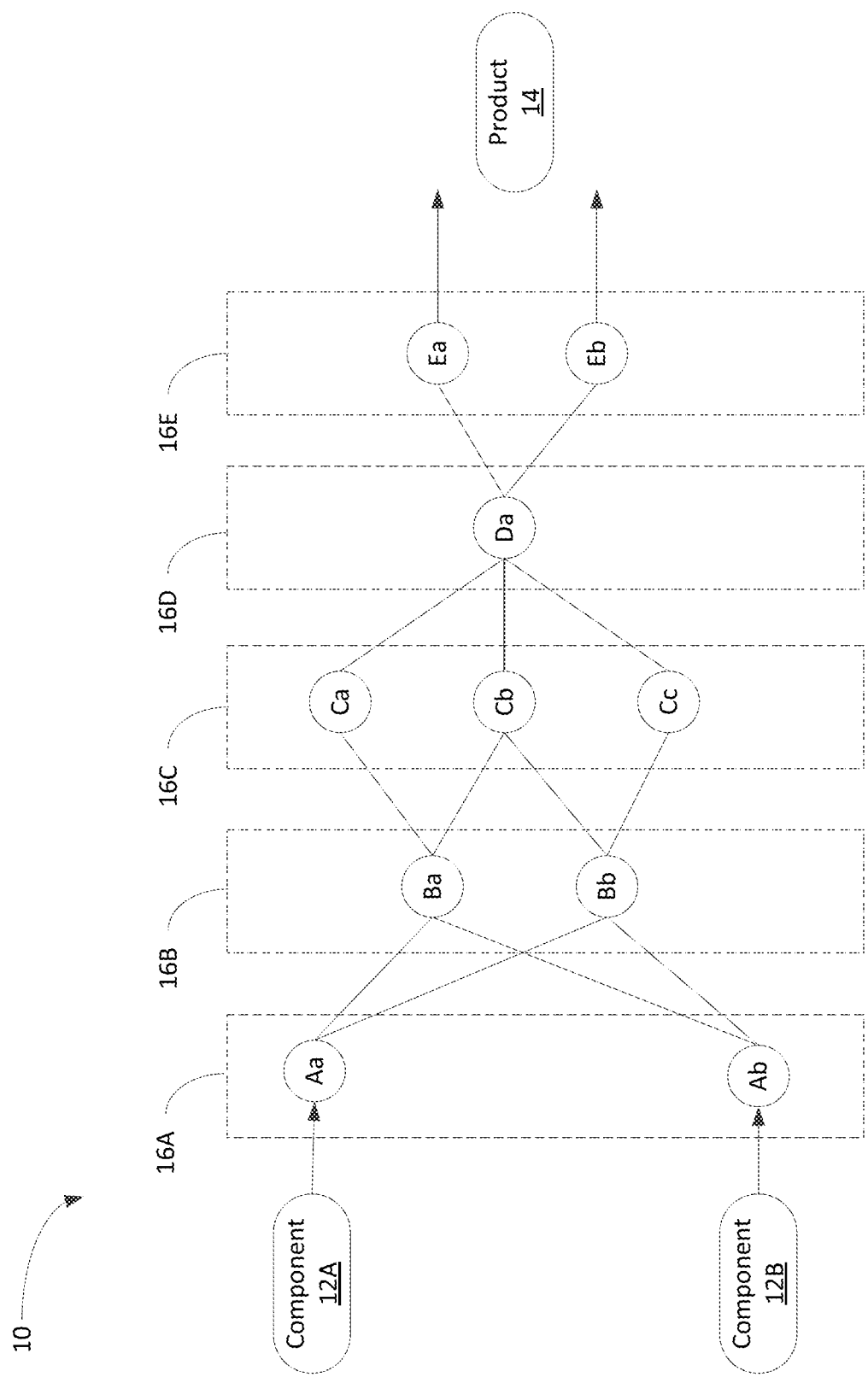
FIG. 1 schematically illustrates an assembly line producing a product according to one embodiment.

FIG. 1 schematically illustrates an assembly line 10. It should be understood that the assembly line 10 illustrated in FIG. 1 is provided as one example of an assembly line, and the embodiments described herein may be used with any type of assembly line (e.g., an assembly line for automotive parts, automobiles, aircrafts, heavy equipment, and the like) and are not limited to the example assembly line 10 illustrated in FIG. 1.

As illustrated in FIG. 1, the assembly line 10 receives a first component 12A and a second component 12B as input and produces a product 14 (e.g., at an end of the assembly line 10). The assembly line 10 also includes a plurality of stations that are used to convert the first component 12A and the second component 12B into the product 14. For example, as illustrated in FIG. 1, the assembly line 10 includes five stages of production (e.g., five stations along the assembly line 10) for the product 14 and each stage includes one or more stations. A first stage 16A (i.e., a supply stage) includes a plurality of first stations Aa and Ab. A second stage 16B (i.e., an attachment stage) includes a plurality of second stations Ba and Bb. A third stage 16C (i.e., a collection stage) includes a plurality of third stations Ca, Cb, and Cc. A fourth stage 16D (i.e., a finishing stage) includes a fourth station Da. A fifth stage 16E (i.e., a testing stage) includes a plurality of fifth stations Ea and Eb.

In the first stage 16A, each of the plurality of first stations Aa and Ab supplies a first component 12A or a second component 12B to one of the plurality of second stations Ba and Bb via edges (illustrated in FIG. 1 as lines connecting stations) between the plurality of first stations Aa and Ab and the plurality of second stations Ba and Bb. Each of the plurality of second stations Ba and Bb attaches the first component 12A to the second component 12B to create a new composite part. The composite parts provided by the plurality of second stations Ba and Bb are collected in the plurality of third stations Ca, Cb, and Cc. The plurality of third stations Ca, Cb, and Cc acts as a temporary repository for the composite parts until the composite parts are supplied to the fourth station Da. The fourth station Da applies a finishing coating or surface to the composite part and moves the composite part to one of the plurality of fifth stations Ea and Eb, which tests the received composite part. For example, each of the plurality of fifth stations Ea and Eb may test a received composite part by taking one or more measures of the composite part (e.g., size, shape, color, temperature, position, and the like). The measurements may be used to determine whether the composite part passes or fails one or more approval metrics. When the measurements do not satisfy the approval metrics, the composite part fails the metric. Conversely, when the measurements satisfy one or more of the approval metrics, the composite part may pass the metric. In some embodiments, composite parts failing the approval metric are scrapped.

Figure 2:
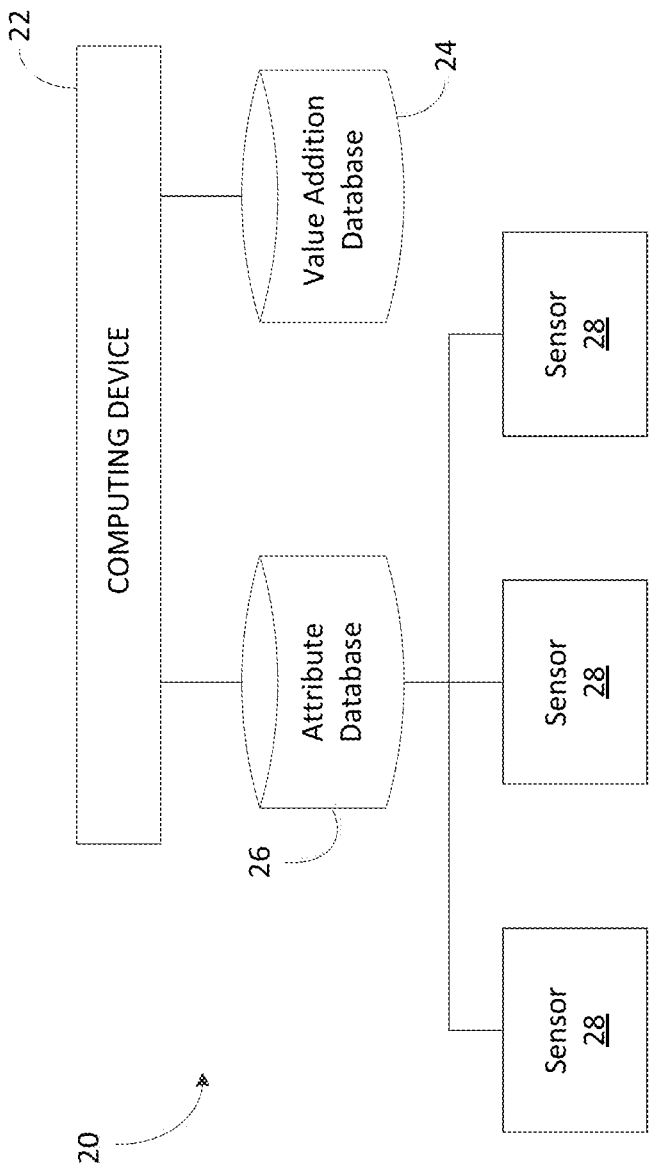
FIG. 2 schematically illustrates a system for performing value addition dependent data mining associated with the assembly line of FIG. 1 according to one embodiment.

FIG. 2 schematically illustrates a system 20 for performing value addition dependent data mining associated with the assembly line 10. As illustrated in FIG. 2, the system 20 includes a computing device 22, a value addition database 24, an attribute database 26, and one or more sensors 28. It should be understood that the system 20 may include different components than illustrated in FIG. 2. For example, the system 20 may include additional sensors, storage mechanisms, computing devices, or a combination thereof. For example, in some embodiments, the attribute database 26 includes a manufacturing execution system ("MES") database, a log data database, one or more text files, or a combination thereof that performs the functionality of the attribute database 26 as described herein or act as intermediate storage mechanisms between the sensors 28 and the attribute database 26. Also, in some embodiments, the value addition database 24, the attribute database 26, or both may be included in the computing device 22. Similarly, in some embodiments, the value addition database 24 and the attribute database 26 may be included within the same database.

Each part passing through the assembly line 10 is associated with a list of attributes. Observations pertaining to these attributes are recorded in the form of measurements and tests performed at one or more of the stations of the assembly line 10. For example, each station may record some measurements or tests pertaining to each part processed by the station. The measurement and test data may be stored locally (i.e., with the station), in or more remote storage mechanisms, or a combination thereof. For example, in some embodiments, the measurement and test data is stored in the attribute database 26. As noted above, the attribute database 26 may include a MES database, a log database, text files, or a combination thereof.

In some embodiments, the measurement and test data is collected by the sensors 28, and the attribute database 26 receives and stores the measurement and test data from the sensors 28. The attribute database 26 may communicate with the sensors 28 over a wired connection, a wireless connection, or a combination thereof. For example, in some embodiments, the attribute database 26 may communicate with some of the sensors 28 over a wired connection and may communicate with some of the sensors 28 over a wireless connection. In some embodiments, when the attribute database 26 communicates with one or more of the sensors 28 over a wireless connection, the wireless network may include the Internet, a mesh network, a cellular network, a private network, a public network, or a combination thereof. Also, in some embodiments, one or more intermediary devices may manage communication between the sensors 28 and the attribute database 26. For example, one or more intermediate devices may communicate with the sensors 28 and forward data received from the sensors 28 to the attribute database 26 (e.g., with or without processing). In particular, in some embodiments, the sensors 28 may communicate with the computing device 22, and the computing device 22 may forward data received from the sensors 28 (e.g., with or without processing) to the attribute database 26. As mentioned above, in some embodiments, the sensors 28 may communicate with one or more intermediary storage devices (e.g., a MES database, a log database, text files, and the like) and the one or more intermediary storage devices may forward data received from the sensors 28 to the attribute database 26.

Each sensor 28 may be associated with (e.g., positioned near to) one or more stations included in the assembly line 10. For example, using the example assembly line 10 illustrated in FIG. 1, a sensor 28 may be associated with each of the plurality of stations included in the assembly line 10. The sensors 28 collect raw data pertaining to each component (e.g., components 12A and 12B) and/or composite part processed by the plurality of stations. In particular, in some embodiments, the raw data collected by the sensors 28 include data pertaining to a part passing through the assembly line 10, such as a measurement or a test result (e.g., whether the part passes or fails one or more approval metrics for the assembly line 10). In some embodiments, the data also includes value added data indicating a value added by a particular station. In some embodiments, the sensors 28 may include an image sensor (e.g., a camera), a barcode reader, a radio frequency receiver, a temperature sensor, a proximity sensor, a measurement sensor, and the like. In some embodiments, the data received from the sensors 28 is cleaned, translated, and integrated prior to being communicated to the attribute database 26.

The value addition database 24 receives and stores value addition data. The value addition data may include a non-negative value that represents a value added at each station of the assembly line 10. The value added at each station may include, for example, the cost of the components or composite parts added by each station, the cost of adding the component, power consumption or other costs associated with station, and the like. In some embodiments, the value addition database 24 receives value addition data from the sensors 28, from one or more intermediary storage devices, from one or more intermediary computing devices, or a combination thereof. The value addition data may be stored locally (i.e., with a station), in one or more remote storage mechanisms, or the combination thereof.

As illustrated in FIG. 2, both the value addition database 24 and the attribute database 26 may communicate with the computing device 22. The value addition database 24 and the attribute database 26 may communicate with the computing device 22 over a wired connection, a wireless connection, or a combination thereof. For example, in some embodiments, the value addition database 24 and the attribute database 26 communicate with the computing device 22 over a wireless communication network, such as the Internet, a mesh network, a cellular network, a private network, a public network, or a combination thereof. Also, in some embodiments, one or more intermediary devices may manage communication between the computing device 22 and the value addition database 24, the attribute database 26, or both. Also, as noted above, in some embodiments, the value addition database 24, the attribute database 26, or both are included in the computing device 22.

Figure 3:
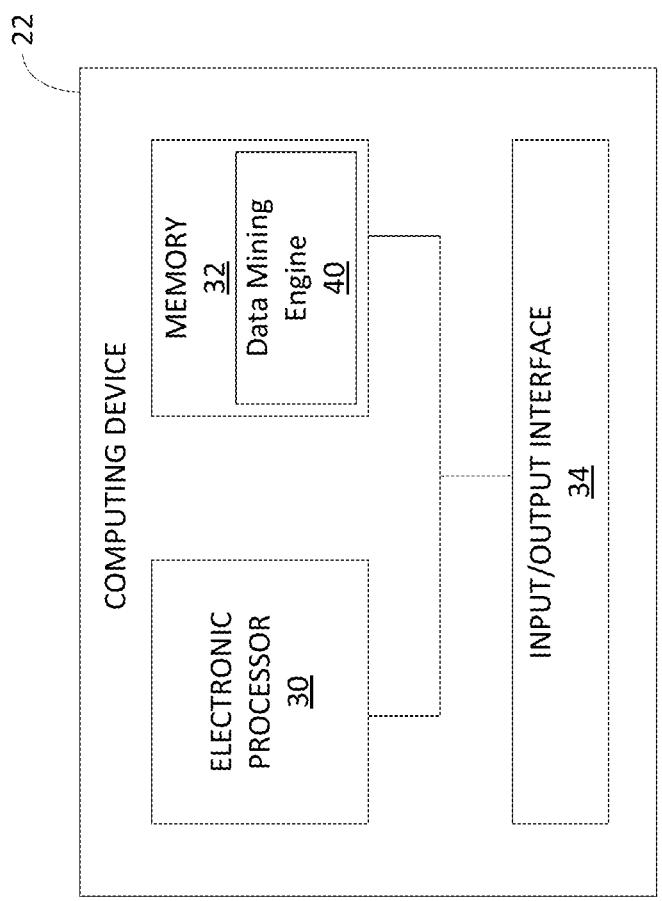
FIG. 3 schematically illustrates a computing device included in the system of FIG. 2 according to one embodiment.

The computing device 22 may include a server that includes a plurality of electrical and electronic components that provide power, operational control, and protection of the components within the computing device 22. For example, as illustrated in FIG. 3, the computing device 22 may include an electronic processor 30 (e.g., a microprocessor or another suitable programmable device), non-transitory computer-readable medium 32 (e.g., a computer-readable storage medium), and an input/output interface 34. The electronic processor 30, the computer-readable medium 32, and the input/output interface 34 communicate over one or more control or data connections or buses. It should be understood that the computing device 22 illustrated in FIG. 3 represents one example of a computing device 22 and embodiments described herein may include computing devices with additional, fewer, or different components than the computing device 22 illustrated in FIG. 3. Also, in some embodiments, the computing device 22 performs functionality in addition to the functionality described herein.

The computer-readable medium 32 of the computing device 22 may include a program storage area and a data storage area. The program storage area and the data storage area may include read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, a secure digital ("SD") card, other suitable memory devices, or a combination thereof. The electronic processor 30 executes computer-readable instructions ("software") stored in the computer-readable medium 32. The software may include firmware, one or more applications, program data, filters, rules, one or more program modules, and other executable instructions. For example, the software may include instructions for and associated data for identifying a station of an assembly line as described herein. In accordance with some embodiments of the present invention, the computer-readable medium 32 stores a data mining engine 40. As described in more detail below, the data mining engine 40, when executed by the electronic processor 30, receives data and generates a data model.

The computing device 22 (i.e., the electronic processor 30) executes instructions (e.g., stored in the computer-readable medium 32) to perform value addition dependent data mining. In particular, the computing device 22 (i.e., the electronic processor 30) may execute instructions to perform the method 50 illustrated in FIG. 4. The method 50 is described in terms of identifying a station of the assembly line 10. However, as described in more detail below, identifying such a station may include identifying a prioritized list of stations, identifying a value for a tunable parameter of a station, identifying an effect of a station on a target parameter, such as an approval metric, a performing a measurement of an importance of a station, determining an optimization of a station or a plurality of stations, providing a low-yield analysis, providing a high-yield analysis, providing a high scrap analysis, providing a root cause analysis, identifying one or more stations effecting a particular target value, yield value, or scrap value, identifying one or more stations for inspection or design of experiments, and the like. The method 50 is described in terms of the assembly line 10. It should be understood, however, that the assembly line 10 is merely provided as an example, and the method 50 may be applied to any type of assembly line and is not limited to the assembly line 10 illustrated in FIG. 1. For example, the method 50 may be used with assembly lines that include fewer, additional, or different input, stations, stages, and outputs (i.e., products) than the assembly line 10.

Figure 4:
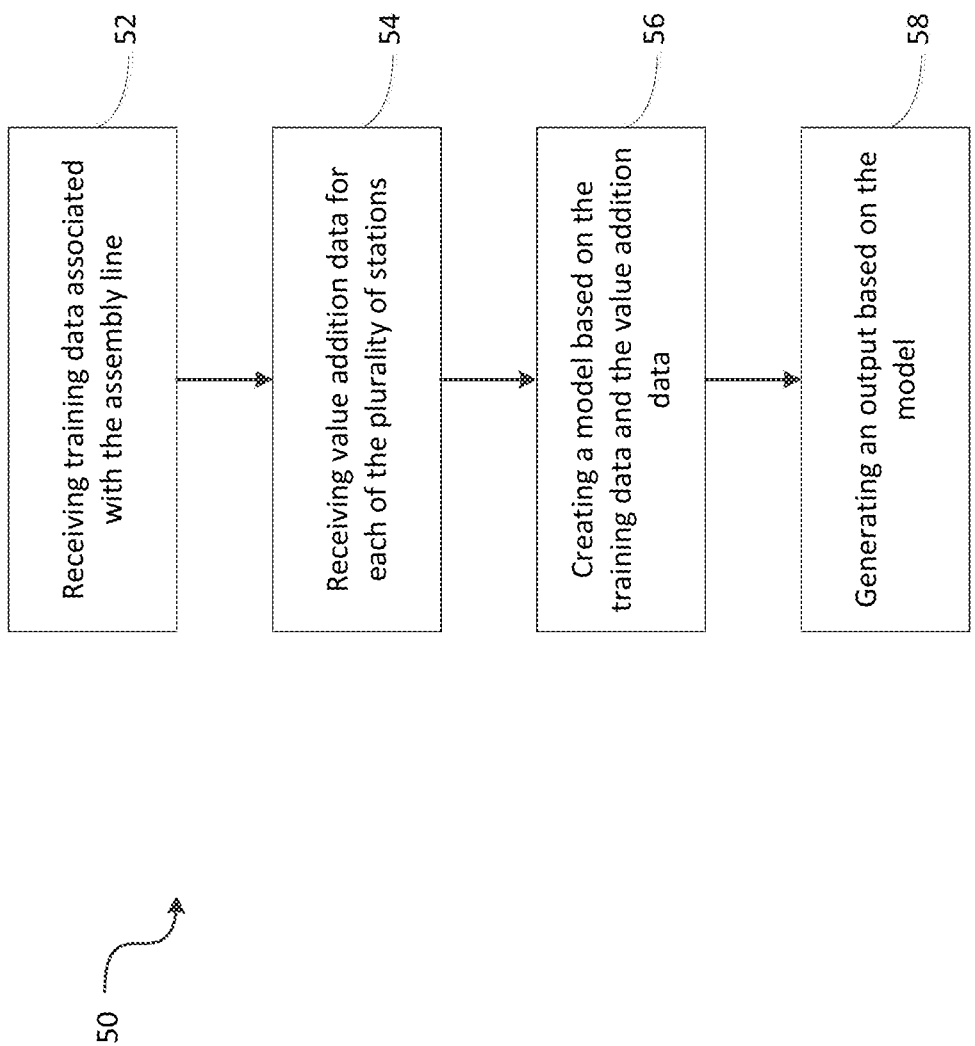
FIG. 4 is a flowchart illustrating a method of evaluating an assembly line of FIG. 1 using the system of FIG. 2 according to one embodiment.

As illustrated in FIG. 4, the method 50 includes receiving, with the electronic processor 30 of the computing device 22, training data associated with the assembly line 10 (at block 52). The training data may include the data collected by the sensors 28. As described above, the measurement and test data collected at each of the plurality of stations pertains to an attribute associated with a part as the part is processed by the assembly line 10. In some embodiments, the computing device 22 receives the training data from the attribute database 26 via the input/output interface 34 of the computing device 22. However, it should be understood that in some embodiments, the computing device 22 receives the training data (i.e., raw data) from a plurality of storage mechanisms. Also, in some embodiments, the computing device 22 may perform data translation and integration of the training data. The acquired training data (e.g., as cleaned, translated, and integrated) may be referred to herein as an "attribute datastore," which may reside in the computer-readable medium 32 of the computing device 22, a remote storage mechanism, or a combination thereof.

The method 50 also includes receiving, with the electronic processor 30 of the computing device 22, value addition data (at block 54). In some embodiments, the electronic processor 30 receives value addition data associated with each of the plurality of stations included in the assembly line 10. As described above, the value addition data includes a non-negative value representing the value added by each of the plurality of stations. In some embodiments, the computing device 22 receives the value addition data from the value addition database 24 via the input/output interface 34 of the computing device 22. In some embodiments, the computing device 22 may perform data translation and integration of the value addition data.

The method 50 also includes creating, with the electronic processor 30 of the computing device 22, a model based on the training data and the value addition data (at block 56).

For example, the training data and the value addition data may be provided to the data mining engine 40. The data mining engine 40 uses the training data and the value addition data to create the model. It is to be understood that the model may be based on additional data. For example, the data mining engine 40 may also receive data from one or more devices separate from the computing device 22 (e.g., one or more intermediary computing devices and/or one or more intermediary storage devices). Furthermore, it is to be understood that more than one model may be created by the data mining engine 40.

In some embodiments, the data mining engine 40 creates the model using one or more machine learning functions. Machine learning functions allow a computer application to learn without being explicitly programmed. In particular, a computer application performing machine learning functions (sometimes referred to as a learning engine) is configured to develop an algorithm based on input data. For example, to perform supervised learning, the input data includes example inputs and corresponding desired (e.g., actual) outputs, and the data mining engine 40 progressively develops a model that maps inputs to the outputs. As described in more detail below, machine learning may be performed using various types of methods and mechanisms including but not limited to decision tree learning, association rule learning, artificial neural networks, inductive logic programming, support vector machines, clustering, Bayesian networks, reinforcement learning, representation learning, similarity and metric learning, sparse dictionary learning, and genetic algorithms.

The method 50 also includes generating an output, with the electronic processor 30 of the computing device 22, based on the model (at block 58). The output represents an analysis of the assembly line 10. In some embodiments, the output includes an identifier of a station contributing to low-yield, high-yield, or high-scrap or a station needing maintenance or tuning. Similarly, in some embodiments, the output includes a list of stations, such as a prioritized list of stations ordered based on their importance or their need for maintenance or tuning. Furthermore, in some embodiments, the output includes suggestions for values of tunable parameters of a specific station of the assembly line 10. The suggested value may help reduce scrap (e.g., bringing scrap from a high scrap zone to a low scrap zone). Furthermore, in some embodiments, the output may include a list of, for example, stations, tests, measurements, or a combination thereof to be investigated for design of experiments or inspection for being correlated with low yield (i.e., aspects affecting scrap production). In some embodiments, the output is provided on an output mechanism coupled to the computing device 22, such as a display device or a printer.

In some embodiments, the data model generated with the data mining engine 40 includes a decision tree. For example, data mining engine 40 may learn and implement a decision tree for identifying a station in the assembly line 10 or performing other analysis of the assembly line 10 using value addition data mining techniques.

Decision tree learning (and its descendants) is an inductive process that builds a classifier by recursively branching out from a single input node to tree-structured decision nodes to maximize a splitting criterion. For example, on training data $D=\{x^{(i)}, y^{(i)}\}^n_{i=1}$, where $x^{(i)}$ is $(x_1^{(i)}, \ldots, x_m^{(i)})$ $\in R^m$ (a length m feature vector for the i-th observation) and $y^{(i)}$ is its class label, a decision tree may be built according to the following functionality:

(1) Select the host splitting feature and value on D according to a splitting criterion.

(2) Create a decision node that splits on the feature and value selected; correspondingly, partition D into $D_L$ and $D_R$.

(3) Repeat steps 1-3 on $D_L$ and $D_R$ until resultant nodes satisfy stopping criteria.

During the recursive process, the data mining engine 40 goes over each variable-value pair $(x_j, v_k)$ and finds the best decision branch that maximizes a decision theoretic measure measured by a splitting criterion. For example, the iterative dichotomiser 3 ("ID3") algorithm developed by Ross Quinlan uses information gain to select such a variable-value pair. As a result, the ID3 algorithm implements step 1 of the above functionality as specified below:

| FindBestSplit |
| --- |
| 1: for j = 1 to m do |
| 2:  Sort the distinct values $v_k$ of $x_j^{(i)}$, where k is the index of distinct values and ranges from 1 to the cardinality of feature variable $x_j$, $\Omega(x_j)$ |
| 3:  for k = 1 to $\Omega(x_j)$ do |
| 4:   Partition D by testing if $x_j^{(i)} < v_k$ |
| 5:   Measure the information gain from the partition; denote it as InfoGain$_{jk}$ |
| 6:  end for |
| 7: end for |
| 8: BestSplit (j,k) = argmax$_{jk}$ InfoGain$_{jk}$ |

Using the assembly line 10 illustrated in FIG. 1 and the above described decision tree methodologies, the input to the decision tree may be the causal factors associated with each of the plurality of stations in the assembly line 10 and the value associated with each of the plurality of stations. The output may be a hierarchical combination of decisions on the casual factors where the position of a decision in a hierarchy is influenced both by a decision-theoretic metric and the location where the decision is taken in the assembly line (e.g., at a station within the assembly line 10). As described above, the data mining engine 40 may be provided with training data and value addition data. The data mining engine 40 may use the training data and the value addition data to learn the decision tree.

Figure 5:
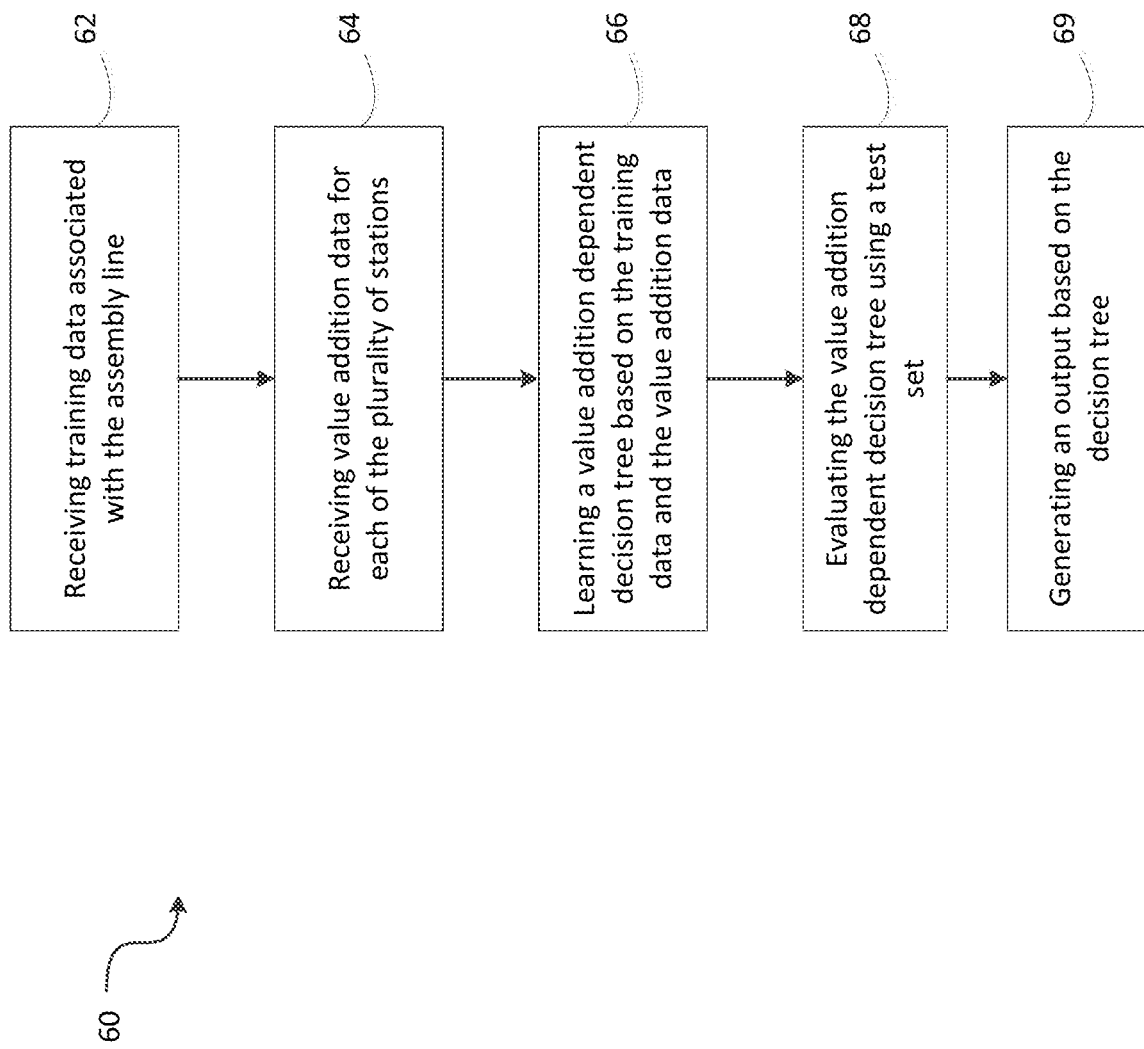
FIG. 5 is a flowchart illustrating a method of evaluating an assembly line of FIG. 1 using the system of FIG. 2 using a decision tree according to one embodiment.

For example, the computing device 22 (i.e., the electronic processor 30) may execute instructions to perform the method 60 illustrated in FIG. 5. As described above with respect to the method 50, the method 60 is described in terms of identifying a station of the assembly line 10. However, as described in more detail below, the method 60 may be used to provide other types of outputs. Also, the method 60 is described in terms of the assembly line 10. It should be understood, however, that the assembly line 10 is merely provided as an example, and the method 60 may be applied to any type of assembly line and is not limited to the assembly line 10 illustrated in FIG. 1. For example, the method 60 may be used with assembly lines that include fewer, additional, or different input, stations, stages, and outputs (i.e., products) than the assembly line 10.

As illustrated in FIG. 5, the method 60 includes receiving, with the electronic processor 30 of the computing device 22, training data associated with the assembly line 10 (at block 62) as described above with respect to the method 50. The method 60 also includes receiving, with the electronic processor 30 of the computing device 22, value addition data (at block 64) as also described above with respect to the method 50.

The method 60 also includes learning, with the electronic processor 30 of the computing device 22, a value addition dependent decision tree based on the training data and the value addition data (at block 66). For example, the training data and the value addition data may be provided to the data mining engine 40. The data mining engine 40 uses the training data and the value addition data to learn the decision tree.

Figure 6:
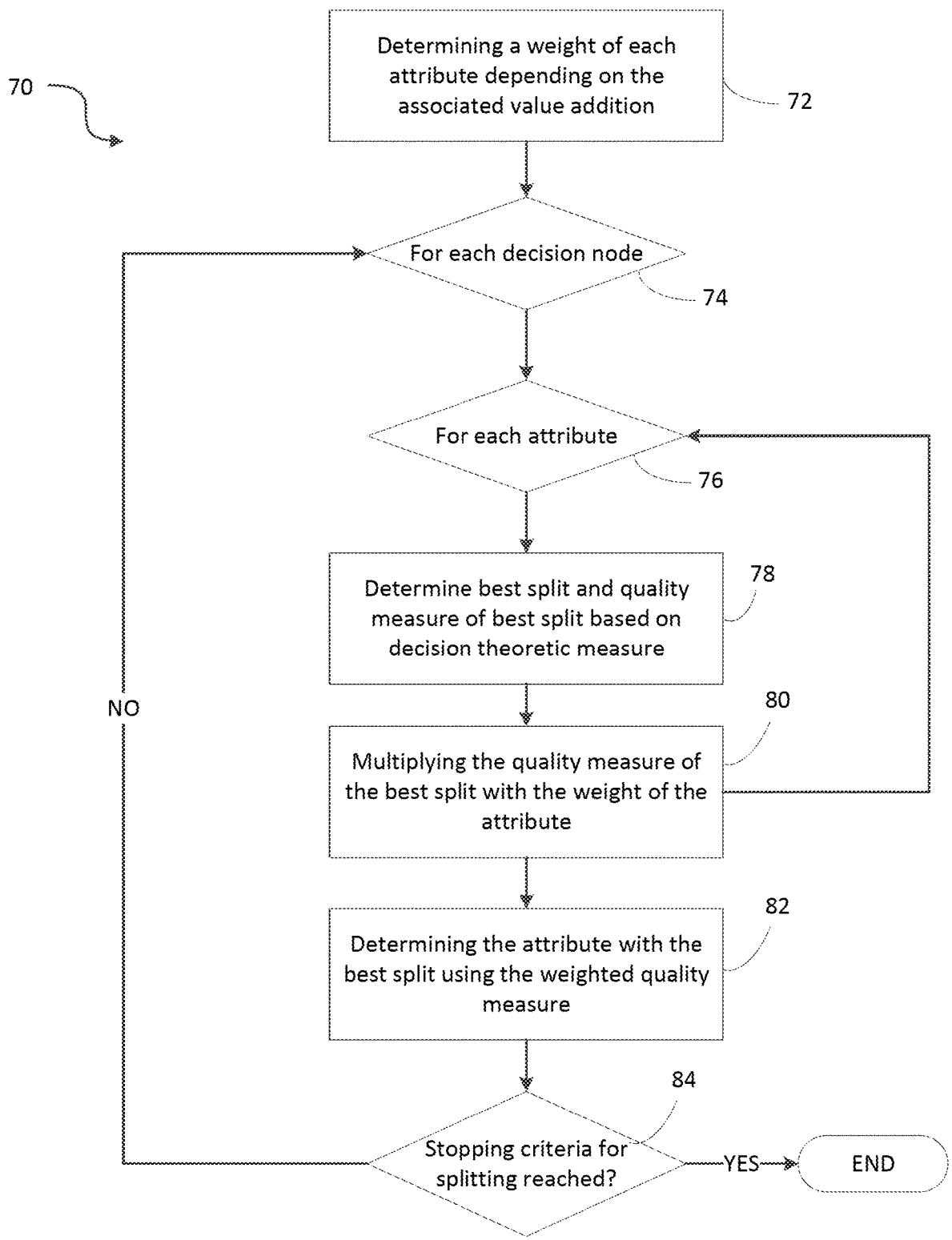
FIG. 6 is a flowchart illustrating a method of learning a decision tree performed as part of the method of FIG. 5 according to one embodiment.
Figure 7:
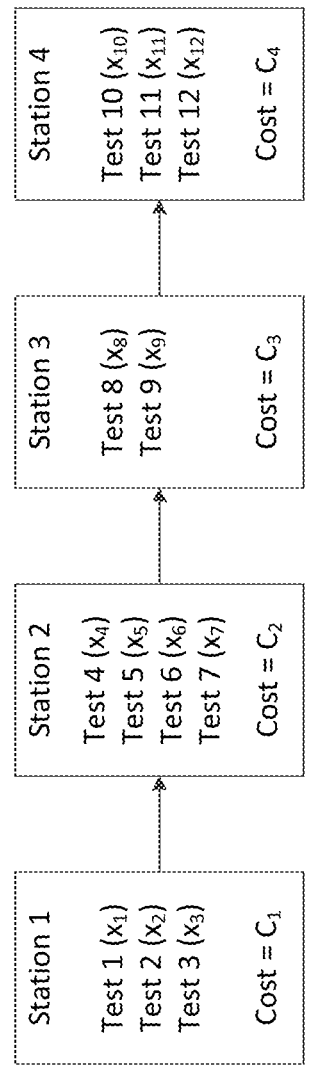
FIG. 7 schematically illustrates tests and associated costs for a line of stations included in an assembly line.

For example, FIG. 6 illustrates a method 70 of learning a value addition dependent decision tree. The data mining engine 40 may perform the method 70 as part of the method 60. As illustrated in FIG. 6, the method 70 includes determining a weight of each attribute (i.e., each data point included in the training data) depending on the associated value addition data (i.e., the value addition data of the station associated with each attribute) (at block 72). In some embodiments, the weight of each attribute considers the value added in each of the plurality of stations (e.g., the cost of each station). For example, assume an assembly line has S stations (indexed by s). Each station s consists of $T_s$ tests and has cost $C_s$ assigned, which specifies the cost to perform all $T_s$ tests in station s. A station is an atomic unit performing tests (atomicity). That is, the cost $C_s$ is a one-time cost for station s, and cannot be paid separately for each test in s. Therefore, once cost $C_s$ is paid, any test values in station s are available with no additional costs (singleness). For example, FIG. 7 illustrates one example of an assembly line 73 that includes four stations (Station 1, Station 2, Station 3, and Station 4) and twelve tests (Test 1 ($x_i$), Test 2 ($x_i$), Test 3 ($x_i$), Test 4 ($x_i$), Test 5 ($x_i$), Test 6 ($x_i$), Test 7 ($x_i$), Test 8 ($x_i$), Test 9 ($x_i$), Test 10 ($x_i$), Test 11 ($x_i$), and Test 12 ($x_i$)). As illustrated in FIG. 7, each station is associated with a single cost ($C_1$, $C_2$, $C_3$, and $C_4$).

For example, in some embodiments, the data mining engine 40 determines a weight $W_s$ from costs $C_s$ using the following Equation (1):

$$W_s = \frac{1}{1 + \beta \times \frac{C_s}{\sum_{s'} C_{s'}}} \quad \text{Equation (1)}$$

where β is a user-specified, non-negative parameter that controls the influence of costs in tree building. The smaller the value of β is, the lower the influence of the cost is to the decision tree (i.e., the selection of the best split). As illustrated in Equation (1), in some embodiments, the weight has a value in a range of 0 to 1.

As illustrated in FIG. 6, the method 70 also includes, for each decision node of the tree (at block 74) and for each attribute (at block 76), determining the best split and the quality measure of the best split based on a decision theoretic measure (i.e., a decision theoretic score) (at block 78). The decision theoretic measure may be information gain (e.g., Renyi information gain, Tsallis information gain, or a combination thereof), accuracy, and the like.

The method 70 also includes multiplying the quality measure of the best split with the weight of the attribute to generate a weighted quality measure (at block 80). As illustrated above in Equation (1), in some embodiments, the weight ranges between 0 and 1. Therefore, multiplying the weight by the quality may effectively lower the quality measurement according to the value of the cost $C_s$.

Also, in some embodiments, to implement the idea of atomicity and singleness, a cost $C_s$ is updated to 0 once any of the tests associated with a station are used. When a cost Cs becomes 0, the weight $W_s$ in turns becomes 1 which means that there will be no discount on the corresponding station. As the result, the decision tree my prefer tests whose cost is paid in previous recursions. For example, In some embodiments, as illustrated in below, the best split may be determined using a split selection procedure associated with the ID3 algorithm:

| FindBestSplit-ValueAssociated |
|---|
| 1:     for j = 1 to m do |
| 2:        Sort the distinct values $v_k$ of $x_j^{(i)}$, where k is the index of distinct values and ranges from 1 to the cardinality of feature variable $x_j$, $\Omega(x_j)$ |
| 3:        for k = 1 to $\Omega(x_j)$ do |
| 4:           Partition D by testing if $x_j^{(i)} < v_k$ |
| 5:           Measure the information gain from the partition; denote it as InfoGain$_{jk}$ |
| 6:        end for |
| 7:        Discount $\{InfoGain_{jk}\}^{\Omega(xj)}_{k=1}$ by multiplying the corresponding factor $W_s$ |
| 8:     end for |
| 9:     BestSplit (j,k) = argmax$_{jk}$ InfoGain$_{jk}$ |

As illustrated in FIG. 6, the method 70 also includes determining the attribute with the best split using the weight quality measure (at block 82). The method 70 then repeats the determination of the attribute with the best split for each attribute (at block 76). After the determination has been made for each attribute, the method 70 includes determining whether the stopping criteria for splitting has been reached (at block 84). When the stopping criteria has been reached (e.g., when no further split produces positive information gain), the method 70 ends. Alternatively, when the stopping criteria has not been reached, the method 70 repeats the determination of the attribute for each attribute of another decision node (at block 74).

Returning to FIG. 5, after learning the value addition dependent decision tree (at block 66), the method 60 may include evaluating the value addition dependent decision tree using a test set (at block 68). The method 60 may be evaluated by, for example, testing the performance of the model on the test set.

After the decision tree is evaluated, the decision tree may be used to generate an output (at block 69). For example, in some embodiments, the computing device 22 may use the value addition dependent decision tree to perform target parameter analysis (e.g., high scrap analysis or low yield analysis), root cause analysis (e.g., causal factors), and the like. For example, the target parameter may include scrap, yield, or a combination thereof, and the decision tree may indicate attributes that effect scrap (e.g., leading to high scrap or low yield). The importance of an attribute in affecting scrap may be dependent on the decision theoretic based on observations and the position of the attribute in the assembly line. Furthermore, the learned value addition dependent decision tree may be used to predict the target parameter for incoming data. For example, the learned value addition dependent decision tree may be used to predict whether incoming data designates scrap or not. In addition, the decision may be used to suggest values for tunable parameters of the assembly line 10 (e.g., one or more stations) to reduce scrap (e.g., reduce a high scrap zone to a low scrap zone). The decision tree may also identify particular stations (e.g., by outputting one or more identifiers of one or more stations included in the assembly) as important stations or stations needing maintenance, inspection, or tuning.

As noted above, the value addition dependent data mining techniques described herein may be used to evaluate an assembly line in various ways and, consequently, may provide various types of output. In some embodiments, the output may be an identifier of a station, such as a station needing maintenance or tuning or an important station effecting scrap or yield. In other embodiments, the data mining engine 40 may perform a target parameter analysis. A target parameter analysis may include, for example, performing a test measurement (e.g., via the sensors 28) on a component or a composite part during processing through the assembly line 10. Based on the test measurement, that component or the composite part may be labeled as being either scrap or good. Furthermore, the importance of that component or composite part may also be considered in such an analysis. For example, the importance of a component or a composite part may include a combination of the effect on the target parameter and the value addition data associated with that specific component or composite part. Additionally, the importance of a component or a composite part may include a combination of a decision theoretic measure and a value addition dependent measure. A decision theoretic measure may include, for example, information gain, Shannon entropy, Renyi entropy, accuracy, and the like. The combined effect of these two measures may be used to determine a decision made in each node of a decision tree.

Similarly, in some embodiments, the data mining engine 40 uses the value addition dependent data mining to optimize production of the assembly line 10. In particular, the data mining engine 40 may detect, for example, possible nodes, tests, measurements, or a combination thereof correlated with or causing scrap or a low yield earlier in the assembly line if a non-negative value is added in each succeeding node of the assembly line. Additionally, the data mining engine 40 may detect, for example, possible nodes, tests, measurements, or a combination thereof correlated with or causing a target value in the assembly line if a non-negative value is added in each succeeding node of the assembly line. Furthermore, in some embodiments the data mining engine 40 may use the production data and the created model to perform a value addition dependent low yield analysis, a value addition dependent high scrap analysis, a root cause analysis, a value addition dependent root cause analysis, and the like.

Figure 8:
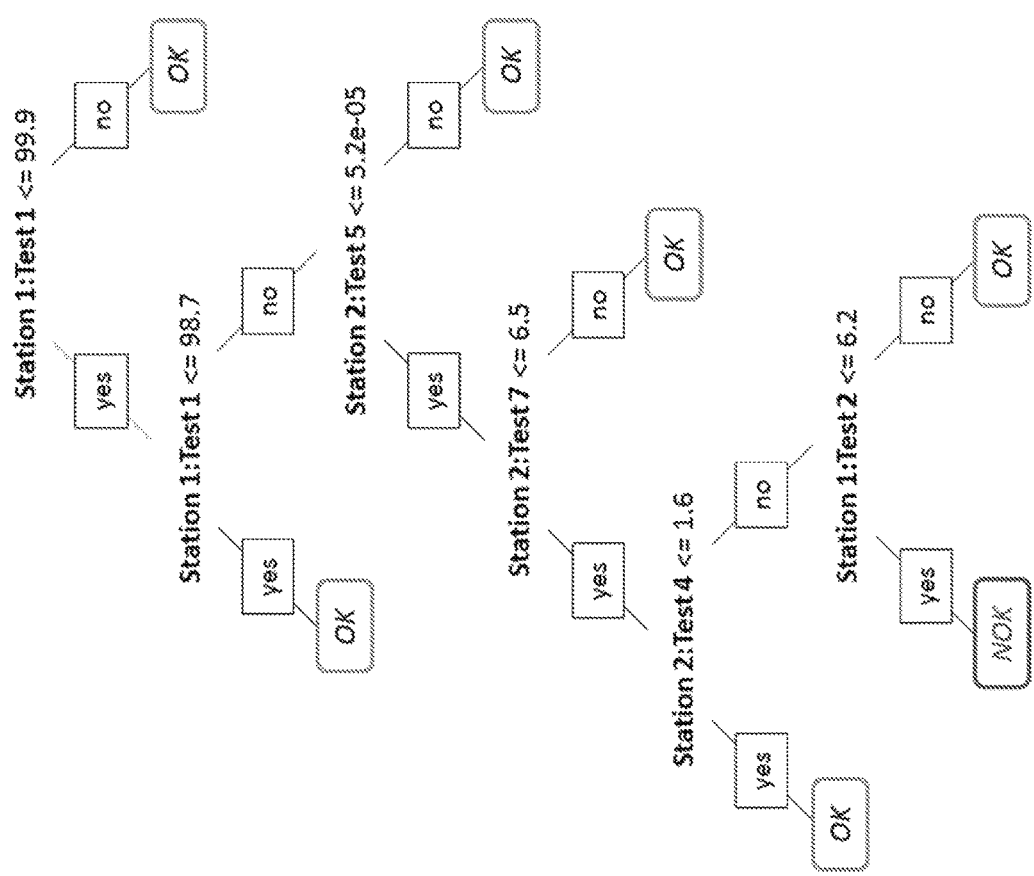
FIG. 8 schematically illustrates an exemplary value addition dependent decision tree according to some embodiments.
Figure 9:
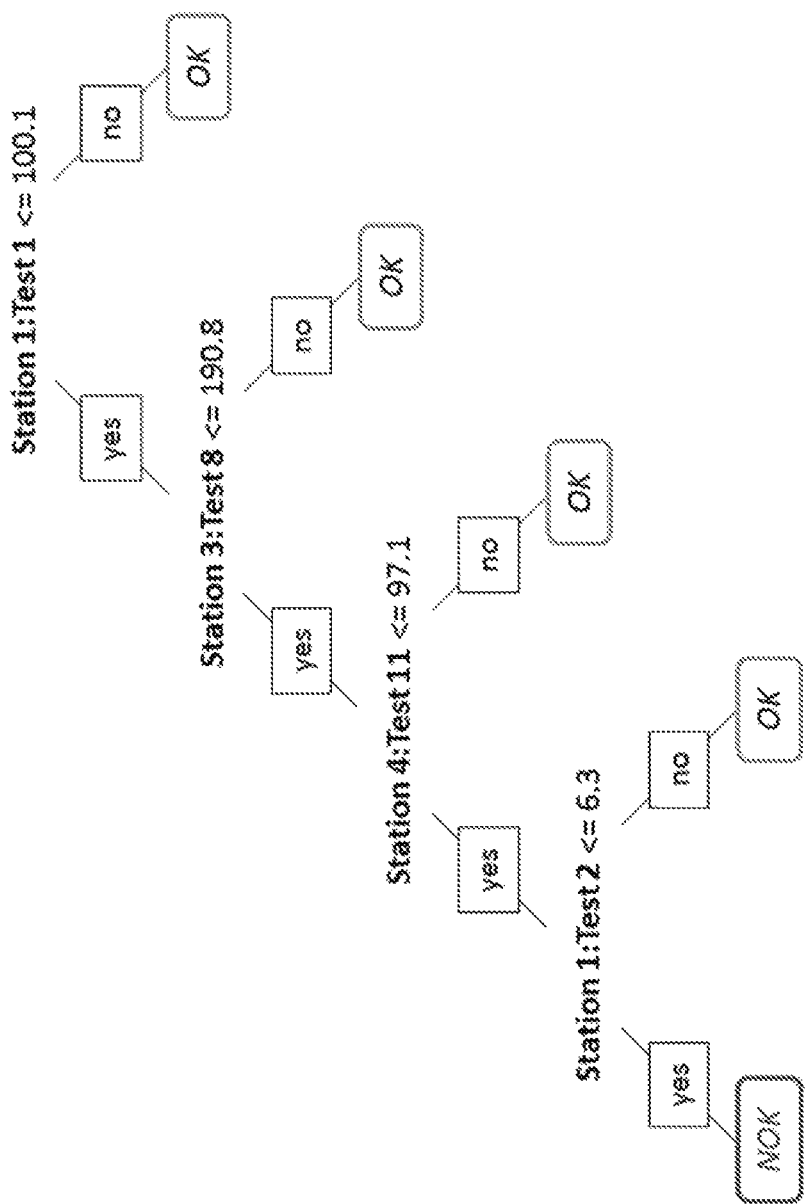
FIG. 9 schematically illustrates an exemplary regular decision tree.

In some embodiments, the data mining engine 40 uses the value addition dependent data mining to optimize a decision tree. Further, a value addition dependent decision tree, as described herein can decrease the cost involved in decision-making by minimizing the number of stations that the decision tree needs. Following the example assembly line 73 seen in FIG. 7, the value addition dependent decision tree disclosed herein only needs Station 1 and Station 2 while a regular decision tree needs Station 1, Station 2, Station 3, and Station 4, as illustrated in the following table:

FIG. 8 schematically illustrates the value addition dependent decision tree provided in the above table and FIG. 9 schematically illustrates the regular decision tree provided in the above table. In other words, compared to a regular decision tree, as illustrated in FIG. 9, the value addition dependent decision tree, as illustrated in FIG. 8, minimizes the number of stations (e.g., tests) required to make decisions. Therefore, although the decision tree size may become larger, the value addition dependent decision tree, as described herein, can find alternative decision paths that reduce the overall testing costs.

Thus, embodiments provide, among other things, methods, systems, and apparatuses for performing value addition dependent data mining in assembly lines. Various features and advantages of the invention are set forth in the following claims.

What is claimed is:

1. A method of performing target parameter analysis for an assembly line manufacturing a product using a plurality of stations, the method comprising:
   receiving, with an electronic processor, training data associated with the assembly line, the training data including a plurality of attributes;
   accessing, with the electronic processor, stored value addition data for each of the plurality of stations, the value addition data for each of the plurality of stations specifying a non-negative value representing a value added to a product being manufactured by the assembly line by the station;
   learning, with the electronic processor, a decision tree based on the training data and the value addition data; and
   performing the target parameter analysis based on the decision tree,
   wherein accessing the stored value addition data for each of the plurality of stations includes accessing at least one selected from a group consisting of a cost of a component added to the product by each station, a cost of adding a component to the product by each station, and a power consumption of each station.

2. The method of claim 1, wherein learning the decision tree includes:
   determining a weight of each attribute included in the plurality of attributes based on the value addition data; and
   for each attribute and for each decision node included in the decision tree until a stopping criteria for splitting is reached,
      determining a best split and a quality measure of the best split based on a decision theoretic measure,

| A Value Addition Dependent Decision Tree | A Regular Decision Tree |
|---|---|
| [Station 1:Test 1<=99.9]<br>--[Station 1:Test 1<=98.7] >> Y: 0<br>--[Station 1:Test 1>98.7]<br>----[Station 2:Test 5<=5.2e-05]<br>------[Station 2:Test 7<=6.5]<br>--------[Station 2:Test 4<=1.6]<br>---------- [Station 1:Test 2<=6.2] >> Y: 1<br>---------- [Station 1:Test 2>6.2] >> Y: 0<br>--------[Station 2:Test 4>1.6] >> Y: 0<br>------ [Station 2:Test 7>6.5] >> Y: 0<br>----[Station 2:Test 5>5.2e-05] >> Y: 0<br>[Station 1:Test 1>99.9] >> Y: 0 | [Station 1:Test 1<=100.1]<br>--[Station 3:Test 8<=190.8]<br>----[Station 4:Test 11<=97.1]<br>------[Station 1:Test 2<=6.3] >> Y: 1<br>------[Station 1:Test 2>6.3] >> Y: 0<br>----[Station 4:Test 11>97.1] >> Y: 0<br>--[Station 3:Test 8>190.7] >> Y: 0<br>[Station 1:Test 1>100.1] >> Y: 0 | multiplying the quality measure of the best split with the weight of the attribute to generate a weighted quality measure, and determining the attribute included in the plurality of attributes with the best split based on the weighted quality measure.

3. The method of claim 2, wherein determining the weight of each attribute includes determining a weight of each attribute based on a cost of performing one or more tests at one of the plurality of stations and a user-specified, non-negative parameter controlling an influence of the cost on the decision tree.

4. The method of claim 2, wherein determining the weight of each attribute includes determining a weight of each attribute within a range of 0 to 1.

5. The method of claim 2, wherein determining the best split includes determining a best split using an iterative dichotomiser algorithm.

6. The method of claim 2, wherein determining the quality measure of the best split based on the decision theoretic measure includes determining the quality measure of the best split based on information gain.

7. The method of claim 1, wherein performing the target parameter analysis includes predicting a value of a target parameter for incoming data.

8. The method of claim 7, wherein predicting the value of the target parameter includes predicting a value of scrap.

9. The method of claim 7, wherein predicting the value of the target parameter includes predicting a value of yield.

10. The method of claim 1, wherein performing the target parameter analysis includes determining an attribute affecting scrap or affecting yield.

11. The method of claim 1, wherein performing the target parameter analysis includes determining at least one station included in the plurality of stations affecting scrap or affecting yield.

12. A system for performing target parameter analysis for an assembly line manufacturing a product using a plurality of stations, the system comprising:
   a server including an electronic processor, the electronic processor configured to:
      receive training data associated with the assembly line, the training data including a plurality of attributes,
      accessing stored value addition data for each of the plurality of stations, the value addition data for each of the plurality of stations specifying a non-negative value representing a value added to a product being manufactured by the station,
      learn a decision tree based on the training data and the value addition data, and
      provide a suggested value for a tunable parameter associated with the assembly line based on the decision tree,
   wherein the stored value addition data for each of the plurality of stations includes at least one selected from a group consisting of a cost of a component added to the product by each station, a cost of adding a component to the product by each station, and a power consumption of each station.

13. The system of claim 12, wherein the electronic processor is configured to learn the decision tree by
   determining a weight of each attribute included in the plurality of attributes based on the value addition data; and
   for each attribute and for each decision node included in the decision tree until a stopping criteria for splitting is reached,
      determining a best split and a quality measure of the best split based on a decision theoretic measure,
      multiplying the quality measure of the best split with the weight of the attribute to generate a weighted quality measure, and
      determining the attribute included in the plurality of attributes with the best split based on the weighted quality measure.

14. The system of claim 12, wherein the tunable parameter includes a tunable parameter for at least one of the plurality of stations.

15. A computer readable medium including instructions that, when executed by an electronic processor, cause the electronic processor to perform a set of functions, the set of functions comprising:
   receiving training data associated with an assembly line manufacturing a product using a plurality of stations, the training data including a plurality of attributes;
   accessing stored value addition data for each of the plurality of stations, the stored value addition data for each of the plurality of stations specifying a non-negative value representing a value added to a product being manufactured by the assembly line by each station;
   generating a data model based on the training data and the value addition data; and
   providing an output evaluating the assembly line based on the data model,
   wherein accessing the stored value addition data for each of the plurality of stations includes accessing at least one selected from a group consisting of a cost of a component added to the product by each station, a cost of adding a component to the product by each station, and a power consumption of each station.

16. The computer readable medium of claim 15, wherein the data model includes a decision tree.

17. The computer readable medium of claim 15, wherein the output includes an identifier of at least one station included in the plurality of stations.

18. The computer readable medium of claim 15, wherein the output includes an ordered list of stations included in the plurality of stations.

19. The computer readable medium of claim 15, wherein the output includes a root cause analysis, wherein an importance of the root cause analysis is dependent on a location of the root cause within the assembly line.

* * * * *